July 24, 1951  F. G. BACK  2,561,774

REFLECTING OPTICAL MIRROR SYSTEM

Filed Nov. 23, 1949

INVENTOR
Frank G. Back
BY
Mock & Blum
ATTORNEYS

Patented July 24, 1951

2,561,774

UNITED STATES PATENT OFFICE 2,561,774

REFLECTING OPTICAL MIRROR SYSTEM

Frank G. Back, New York, N. Y., assignor to F. G. Back Video Corporation, New York, N. Y., a corporation of New York Application November 23, 1949, Serial No. 129,153

10 Claims. (Cl. 88—57)

This invention relates to a new and improved optical system and optical device.

One object of this invention is to provide a mirror combination which can be used instead of a lens or lens system for many purposes. As examples of some of said purposes, the improved mirror combination can be used as a substitute for a telephoto lens or a teleobjective in connection with a camera of any type, such as a television camera, a camera which is used for taking still pictures, and a camera which is used for taking motion pictures.

The invention is of particular utility in connection with a television camera. A television camera has a standard television frame of 24 millimeters by 32 millimeters. A television camera ordinarily has a rotatable turret or turntable which carries four lenses. By turning said turret relative to the television camera, a selected lens of the turret is alined with the photocathode or other part of the television camera or electronic pick-up device which emits electrons, or which is otherwise affected by or responsive to light.

In using a television camera, it is often necessary to change its field rapidly in order to secure rapid successive views of near and far objects, and the turret must then be turned rapidly in order to select the proper lens which corresponds to the distance from the television camera of the object which is viewed.

Hitherto, it has been impossible to use a telephoto lens of long focus in such a turret. The maximum focal length of such telephoto lens for such purpose has been about 25 inches. This required a housing whose length was 25 inches A telephoto lens of a focal length greater than 25 inches is too heavy and too long. By reason of such length and weight, such extra long telephoto lens can not be fixed rigidly to the turret, so that such lens vibrates relative to the turret. Also, such extra long telephoto lens projects into the fields of the other lenses of the turret, and its resolution is inferior, thus producing a picture of inferior clarity and quality.

The invention is preliminarily explained with reference to one embodiment, which has a concave mirror whose shape is a part of a sphere, and three planar mirrors. These planar mirrors are respectively designated as the first, second and third planar mirrors.

For convenience, it is assumed that the longitudinal axis of this concave mirror is horizontal.

Since the distance of the object from the vertex of the spherical mirror exceeds the radius of curvature of the concave reflecting surface of said concave mirror, said concave mirror operates to form a real image of the object, which is intermediate the principal focus and the center of curvature of said concave mirror. This real image is both vertically and laterally inverted. This real image is designated as the original real image.

The first planar mirror may have any peripheral shape, such as circular, square, rectangular, etc. The axis of the concave mirror intersects the center of the first planar mirror, which preferably extends equally above and below said axis. Said first planar mirror is located between the vertex and the principal focus of said concave mirror. Said first planar mirror is inclined rearwardly and upwardly relative to the axis of the concave mirror. Said first planar mirror intercepts all the rays which are originally emitted by the object and which are initially reflected by the concave mirror, or a part of the rays which are originally emitted by the object and which are initially reflected by the concave mirror. Said first planar mirror operates to form a first reflected real image of the object, which is of the same size as the original real image. The first planar mirror laterally inverts the original real image, so that the first reflected real image is free from lateral inversion.

The second planar mirror is located above the concave mirror, and said second planar mirror is axially or longitudinally intermediate the first planar mirror and the concave mirror. This second planar mirror is rearwardly and downwardly inclined relative to the longitudinal axis of the concave mirror, and said second planar mirror reflects the light which is reflected thereto by the first planar mirror, downwardly in a direction which is perpendicular to said axis. The second planar mirror operates to form a second reflected real image of the object. This second real image is laterally inverted.

The third planar mirror is located below the concave mirror and said third planar mirror is upwardly and rearwardly inclined relative to the axis of the concave mirror. The second and third planar mirrors are vertically alined. The third planar mirror reflects the light which it receives from the second planar mirror, rearwardly in a direction parallel to the longitudinal axis of the concave mirror. Said third planar mirror operates to form a third reflected real image which is vertically inverted, but which is free from lateral inversion. This third reflected real image is identical with the original real image, save that the third reflected real image is laterally non-inverted.

The accurately focussed third reflected real image is received upon a target or receiving surface. If the improved device is used in combination with a television camera, the target or receiving surface is the photocathode or other light-sensitive or light-responsive means of the television camera. If the improved device is used in combination with a photographic camera, the receiving surface is the light-sensitive surface of the photographic plate or film.

The concave mirror and the three planar mirrors are fixed either non-adjustably or adjustably to the interior of a casing.

This casing has a rearwardly extending exit tube, through which light is reflected from the third planar mirror. This exit tube is fixed either adjustably or non-adjustably to the casing. Said exit tube is offset relative to the concave mirror.

If the improved device is used in combination with a television camera, the rear end of said exit tube, which is located rearwardly of the casing, is clamped rigidly in one of the openings of the turret. The light-receiving surface or member of the television camera can be adjusted relative to the third mirror, in a direction parallel to said longitudinal axis, in order to make allowance for different distances of different respective objects from the vertex of the concave mirror. If the light-sensitive surface is a photographic plate or film, such light-sensitive surface is similarly axially adjusted relative to the third mirror. The concave mirror and the third planar mirrors are preferably maintained in fixed relative positions and at fixed relative inclinations. The casing is closed save at its front end and save at the connection of said casing and its exit tube. The second and third planar mirrors may have any peripheral shapes. The second planar mirror optionally and preferably reflects all the light which is reflected by the first planar mirror, and the third planar mirror optionally and preferably reflects all the light which is reflected by the second planar mirror. The three planar mirrors are optionally and preferably identical in all respects, including shape and size.

Instead of using a concave mirror whose shape is a part of a sphere, other types of concave mirrors may be used. As one example of an alternative, a paraboloid mirror may be used. In such case, the center of the first planar mirror is located on the longitudinal axis of said paraboloid mirror, between the vertex and the focus of said paraboloid mirror.

The improved mirror combination provides sufficient magnification so that it can fill the standard television frame of 24 millimeters by 32 millimeters, with the image of a man who is at a distance of 200 feet from the camera.

Other objects and advantages and features of this invention are disclosed in the annexed description and diagrammatic drawings, which illustrate a preferred embodiment of the invention, when it is used as a substitute for a telephoto lens of a television camera. In order to provide a complete disclosure, the details of one practical embodiment are later stated herein, including certain specific figures, but the invention is not limited to such details and figures and many changes and omissions and additions and substitutions can be made without departing from the scope of the invention.

The invention is explained in connection with an example in which the concave reflecting surface of concave mirror 3 is a part of a sphere whose radius is 80 inches, so that the focal length of said concave reflecting surface of mirror 3 is 40 inches. The horizontal optical axis X of the optical system is also the optical axis of mirror 3. Said optical axis X intersects the vertex 3a of the concave reflecting surface of mirror 3.

Figure 1:
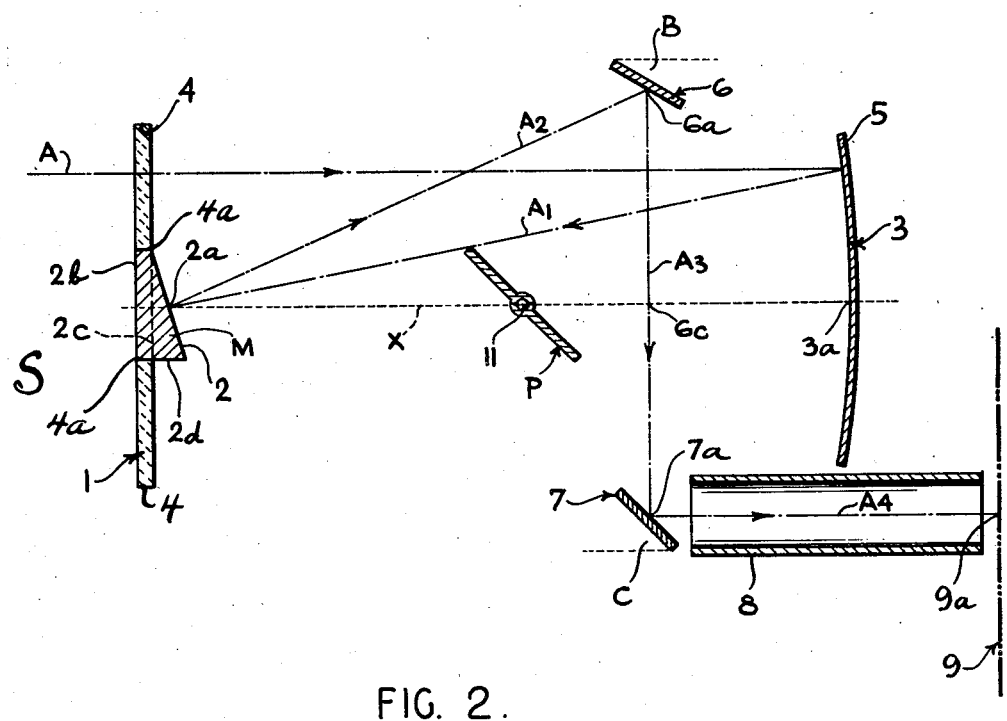
Fig. 1 is a drawing of the improved optical system, in a vertical plane in which the longitudinal optical axis of said system is located. For convenience, said longitudinal optical axis X is shown in the horizontal position.

In this example, the mirror 3 has a circular edge 5, which is located in a vertical plane which is transverse to and perpendicular to the vertical plane of Fig. 1 and axis X. This transverse plane is perpendicular to axis X.

The object space S is in front of the front element 1 of the optical system. This front element has a circular outer periphery 4, and it is colorless and transparent at an edge-portion whose inner edge is defined by a circular line 4a. The centers of the respective circular edges or peripheries 4 and 4a are on axis X.

This front element 1 is optionally integral with a rearwardly projecting member M.

If front element 1 is not integral with said member M, said front element 1 may be a ring which is made of transparent and colorless glass or other material and whose outer and inner circular edges are designated by the lines 4 and 4a in Fig. 1.

In this embodiment, the front and rear planar faces of member 1, between the concentric peripheral lines 4 and 4a, are defined by the front and rear vertical lines 2b and 2c, and said member 1 is of uniform thickness above and below the member M.

It is well-known that spherical aberration occurs when rays are reflected from a concave spherical or paraboloid mirror, especially when the mirror has a large aperture. It is optional to shape the member 1, in order to correct or eliminate such spherical aberration of mirror 3. The mirror 3 may also be shaped to correct or eliminate spherical aberration.

If the member M is made integral with member 1 so that said member M is made of glass or of the other transparent and colorless material of the edge-portion of member 1 between the lines 4 and 4a, said member M is provided with a rear planar mirror surface 2 of metal or other opaque and light-reflecting material. This planar mirror 2 is the first planar mirror surface 2.

Said first planar mirror 2 is inclined upwardly and rearwardly relative to axis X, and said planar mirror 2 is located in a transverse plane which is perpendicular to the plane of Fig. 1.

The base 2d of member M is planar and located in a horizontal plane which is perpendicular to the plane of Fig. 1. The part of member M which extends rearwardly of the rear vertical line 2c is therefore prism-shaped.

If the member M is made separately from the colorless and transparent member 1, said member 1 is ring-shaped. In such case, the member M has a circular flange between the lines 2b and 2c, which fits in the circular internal periphery 4a of the colorless and transparent member 1 and such flange of member M can be cemented or otherwise fixed to the wall of said circular internal periphery 4a. In such case, the member M can be made of metal, with a polished mirror surface 2. Said mirror surface 2 has a central point 2a. The points 2a and 3a are on optical axis X.

A second planar mirror 6 is located above the optical axis X and above the concave mirror 3. This second planar mirror 6 is in a transverse plane which is perpendicular to the vertical plane of Fig. 1. Said transverse plane of mirror 6 is inclined rearwardly and downwardly by an angle B of 30° to the horizontal broken line which is indicated at the top of mirror 6 in Fig. 1. Said planar mirror 6 has a central point 6a.

The third planar mirror 7, which has a central point 7a, is located below optical axis X and below concave mirror 3. Said third planar mirror 7 is in a transverse plane which is perpendicular to the vertical plane of Fig. 1. Said transverse plane of mirror 7 is inclined upwardly and forwardly relative to axis X by an angle C of 45° to the broken horizontal line which is indicated at the bottom edge of mirror 7 in Fig. 1.

The central points 6a and 7a are on a vertical lateral line 6a—6c—7a which intersects the optical axis X at point 6c.

Instead of controlling the light which is incident upon the concave mirror 3 by the usual iris diaphragm, I prefer to use stop means which consist of a thin and opaque and planar stop-plate P, which has a disc-shape.

Said planar stop-plate P is turnable about a horizontal pivot 11 which intersects and is perpendicular to optical axis X. The stop-plate P is symmetrical relative to the pivot axis of pivot 11. Said pivot axis extends through stop-plate P, instead of being offset from said stop-plate. This pivot 11 may be between the points 6c and 3a, and it may be 10.75 inches to the right of point 2a in this embodiment. By changing the inclination of stop-plate P to axis X, more or less of the central portion of mirror 3 is blocked.

When stop-plate P is turnably adjusted relative to concave mirror 3, the image-forming pencil of light which is reflected by the marginal unblocked area of mirror 3 upon the first planar mirror remains symmetrical. This eliminates or minimizes objectionable comatic aberrations and provides maximum resolution in the various adjusted positions of stop-plate P. This is an important advantage in television, in which maximum resolution is required at all times, and it is also important in photography. The blocked area of concave mirror 3 always includes vertex 3a and said blocked area is always symmetrical relative to vertex 3a.

The principal dimensions of the embodiment of this specific example, in which the embodiment is used in combination with a television camera, are approximately as follows:

The diameter of outer periphery 4 is 6.25 inches.

The diameter of internal periphery 4a is 3 inches.

The horizontal distance between the vertical transverse planes of the vertical lines 2b and 2c is 0.25 inch.

The plane of mirror 2 is inclined by an angle of 15°15' to the vertical line 2c. This angle may be in a range of 15°–17°.

The horizontal distance of point 2a from line 2c is 0.50 inch.

The length of the side of mirror 2 which is shown in Fig. 1 is 3.00 inches. If mirror 2 is a circular mirror, its diameter is 3 inches. This length may be increased and the dimensions of the other planar mirrors 6 and 7 may be increased. The point 2a is substantially the median point of the inclined line in the vertical plane of Fig. 1 which designates the planar mirror 2 in Fig. 1, so that mirror 2 extends equally above and below axis X.

The casing D has a cylindrical front part which extends rearwardly from the front edge of casing D through a horizontal distance of 3 inches from line 2b. The member 1 is fixed to the front of said cylindrical front part. The external diameter of said cylindrical front part of casing D is 6.25 inches.

The length of line $A_2$, between the median points 2a and 6a of mirrors 2 and 6, is 7.5 inches.

The length of the side of the planar mirror 6 which is shown in Fig. 1 is 3 inches. If mirror 6 is a circular mirror, its diameter is 3 inches.

The longitudinal distance 2a—6c is 6.375 inches.

The vertical and lateral distance 6a—6c is substantially 3.875 inches.

The vertical and lateral distance 6c—7a is 4.375 inches, so that the length of the line $A_3$ is substantially 8.25 inches. The point 7a is the central point of mirror 7. The length of its side which is shown in Fig. 1 is 3 inches. If mirror 7 is circular, its diameter is 3 inches.

The mirrors 6 and 7 are fixed non-adjustably or adjustably to the internal wall of an intermediate cylindrical enlargement of casing D, whose length is 6.125 inches in the direction of axis X, and whose external diameter is substantially 10.5 inches. The front wall of this intermediate cylindrical enlargement is about 3 inches rearwardly of line 2b.

The casing D has a rear cylindrical part which is located rearwardly of said intermediate enlargement. Said rear cylindrical part has an axial length of 6 inches and an external diameter of substantially 6.25 inches. It protrudes slightly into said intermediate enlargement.

The axial distance between the line 2b and the rear face of the rear wall of the casing D is substantially 14.8 inches.

The axial distance between points 2a and 11 is preferably 10.625 inches.

The diameter of stop-plate P is 4.5 inches.

The axial distance 2a—3a is 13.5 inches to 14 inches.

The point 7a is on horizontal line $A_4$, which is in the same vertical plane as axis X. The vertical distance between axis X and line $A_4$ is 4.375 inches.

The length of cylindrical tube 8 is about 8.5 inches, and its external diameter is about 2.125 inches.

The front end of this tube 8 extends into said intermediate enlargement of casing D.

Said horizontal tube 8 extends about 2 inches to the rear of casing D.

The external diameter of the edge 5 of concave mirror 3 is 6.25 inches.

The thickness of mirror 3 is substantially 0.25 inch, so that the diameter of its reflecting surface is substantially 6 inches at the edge of said mirror 3.

The top point or top edge of mirror 2 is located substantially 1.46 inches vertically above axis X, and the bottom point or edge of mirror 2 is located at the same distance below axis X.

The axis $A_4$ of tube 8 is alined with the central point 9a of the frame of a screen or target or surface 9. In a television camera, said surface 9 may be the electron-emitting photocathode or other light-responsive or light-sensitive surface or element of a pick-up device. In a photographic camera, the point 9a is the central point of the light-sensitive surface of a photographic plate, or the central point of the frame of the film of a motion picture camera.

In using this embodiment, it is preferred to have the object which is being viewed or photographed, located in the front object space S, at a distance of at least 70 feet in front of the vertex 3a, as measured along axis X.

As one example, when said object is 200 feet in front of vertex 3a, as measured along axis X, all the rays A which are emitted by the object and which enter the device through the front member 1 in the space between the outer and inner circular peripheries 4 and 4a, are substantially parallel to the lines represented by line A, and to axis X.

In such case, the distance 7a—9a is adjusted while keeping the distances 2a—3a, 2a—6a, 6a—7a fixed so that the sum of the distances 2a—3a, 2a—6a, 6a—7a, and 7a—9a is 40 inches, namely the focal length of the mirror 3.

If the improved optical device is used in combination with a television camera, said improved optical device is held fixed relative to the casing of the camera. The orthicon screen or other target or receiving surface of the television camera or pick-up is adjusted in the casing of the television camera TVC, in a direction parallel to the line 7a—9a. If the device is used with a photographic camera, the distance between points 7a and 9a is adjusted by the usual means of the photographic camera, by adjusting the photographic plate or film relative to the point 7a, in a direction parallel to axis X and axis A4. As above noted, the distances 2a—3a, 2a—6a, 6a—7a are not changed.

When the object in the front space S is sufficiently close to vertex 3a, as measured along the axis X, the entering rays A are no longer substantially parallel to axis X. The distances 2a—3a, 2a—6a, and 6a—7a are maintained fixed.

The distance 7a—9a is increased as the object is closer to vertex 3a, in order to project the real image of the object which is formed by mirror 7, precisely upon the vertical planar frame of the vertical target or vertical transverse receiving surface 9 of the camera. Thus, if the distance of said object in space S from vertex 3a is 70 feet, as measured along axis X, the distance 7a—9a is increased so that the sum of the distances 2a—3a, 2a—6a, 6a—7a, 7a—9a is 42 inches.

Figure 2:
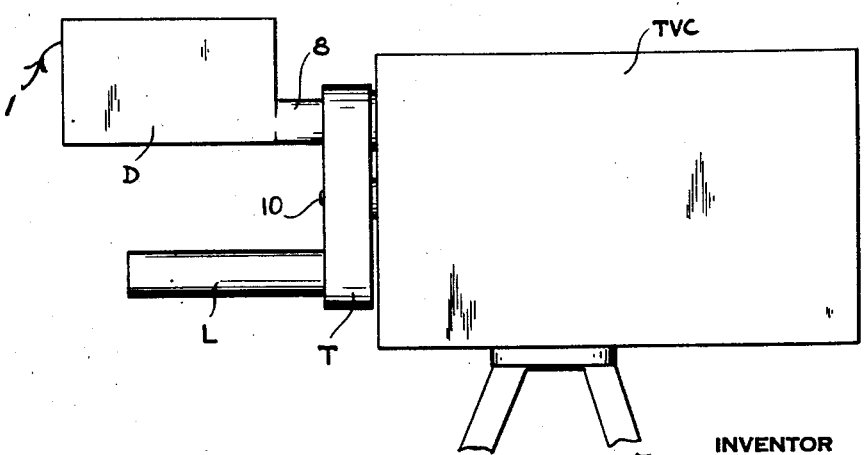
Fig. 2 is a side elevation which shows the improved optical unit fixed to the turret of a television camera.

Fig. 2 shows the turret T of the television camera TVC. Said turret T is turnable relative to the casing of the television camera TVC, around an axis 10, which is parallel to the optical axis X. Fig. 2 shows the housing of another lens L which is fixed to the turret T.

When the improved device is in operative position as shown at the top of Fig. 2, its tube 8 is located in and clamped in one of the openings of turret T. The casing D is then offset relative to its tube 8, save for the part of casing D to which mirror 7 is fixed or connected.

Since a part of tube 8 is located in the opening of turret T, the entire casing D extends forwardly of turret T through a distance less than 25 inches. This distance is so short that casing D does not extend into the fields of the other lenses of the turret T. The maximum length of casing D, including the part of tube 8 which extends forwardly of turret T, is preferably 25 inches.

The distance between point 7a and the rear end of tube 8, as measured along the axial line A4, is 9.75 inches. The internal diameter of tube 8 is 2 inches.

By turning the opaque stop-plate P, the amount of light which falls upon the outer or peripheral area of said concave surface of mirror 3 can be regulated to provide the equivalent of a range of F stops from F/8 to F/22 in the improved system.

*One example of the operation of the system*

Since the height of the chord of the inner reflecting surface of mirror 3 is 6 inches and its radius of curvature is 80 inches, the total angle of mirror 3 is small, approximately 4°.

Hence the usual equation applies, namely, $$\frac{1}{u}+\frac{1}{v}=\frac{1}{40}$$

in which "u" is the radius of curvature of the incident wave upon mirror 3, and "v" is the radius of curvature of the reflected wave which is reflected by the concave surface of mirror 3.

It is assumed that the plane of the first planar mirror 2 is inclined 15°15′ to the vertical line 2b, so that the plane of mirror 2 makes an obtuse angle of approximately 105° with axis X, and that the object is located 100 feet in front of vertex 3a as measured along axis X, and that said object is vertical, and that the height of said object is three feet, and that its central point is on the longitudinal and horizontal axis X.

The concave mirror 3 operates under these conditions to form a first original real image which is vertical and which is both vertically and laterally inverted. The central point of said original real image is on axis X at a distance of approximately 41.31 inches in front of vertex 3a. The height of said original real image is approximately 1.24 inches, namely, approximately 31 millimeters. This height is substantially equal to the height of the standard television frame.

All the entering rays A which are emitted by said object are approximately parallel to axis X, with an angle of less than 2° to axis X, and the rays which are reflected by mirror 3 make an angle of approximately 4° with axis X.

A ray of light which is emitted by the central point of said object, and which just clears the edge of the first planar mirror 2, is therefore approximately coincident with axis X and will be reflected by concave mirror 3 approximately to central point 2a of the first planar mirror 2.

Said ray will be upwardly reflected by mirror 2 at point 2a, at an angle of 30°30′ to axis X. Said ray may be thus reflected along the line A1, to the central point 6a of mirror 6. The central point of the original real image which would be formed by the concave mirror 3, in the absence of first planar mirror 2, would be approximately 27 inches to the left of point 2a along axis X.

Hence the central point of the first real reflected image which would be formed by first planar mirror 2, if second planar mirror 6 were omitted, would be along the path of the ray which is reflected at point 2a, and at a distance of approximately 27 inches from point 2a. Said central point of said first reflected real image would be approximately 13.5 inches laterally above axis X, and approximately 23 inches to the right of point 2a, as measured in a direction parallel to axis X.

If third planar mirror 7 were omitted and the light were reflected vertically downwardly by second planar mirror 6, said mirror 6 would form a horizontal second reflected real image, which would be located approximately 27 inches below the central point 6a of mirror 6.

Hence, by using three planar mirrors, I not only produce a final real image by mirror 7 which is free from lateral inversion, but I also produce a device of very small size, which is especially desirable for use in combination with a television camera. I also produce a final third reflected real image of superior clarity and resolution.

The effect is the same as though the original real image which is formed by concave mirror 3, inverted vertically but not laterally, were located in a vertical plane with its central point on axis A4, and at the proper distance from the target or surface 9.

By comparison with a lens, the angle of view of the improved device with reference to the standard television frame may be very small, less than 1°, as 0.75°.

For use in combination with a television camera, the maximum axial distance from the front of casing D, as defined by line 2b, to the turret T or to the casing of the television camera TVC, is 25 inches.

By decreasing the distance 2a—3a, it is possible to make the device of even smaller size.

The above disclosure applies to the use of a paraboloid mirror 3.

I have referred to the use of three planar mirrors 2, 6 and 7. This is the highly preferred form, but the invention is not limited to the use of three planar mirrors. If one or more of said three mirrors is concave or convex, the variation from the planar form is preferably slight.

The specific example is particularly desirable when using a focussing concave mirror whose focal length in 40 inches.

I have described a preferred embodiment of my invention, but numerous changes and omissions and additions and substitutions can be made without departing from the scope of my invention.

I claim:

1. An optical device which comprises a concave mirror which has a concave reflecting surface which has a geometrical vertex and an axis and a principal focus which is located on said axis in front of said vertex, a first mirror located forwardly of said concave mirror and rearwardly of said principal focus, said first mirror being thus located to intercept light which is forwardly reflected from said concave mirror, said first mirror being inclined to said axis and being of sufficiently small size to leave a part of said concave mirror unblocked to receive incident rays from an object located forwardly of said first mirror, a second mirror located forwardly of said concave mirror and rearwardly of said principal focus, a third mirror located forwardly of said concave mirror and rearwardly of said principal focus, said second mirror and said third mirror being located laterally on opposite sides of said axis, said second mirror being located and inclined to said axis to intercept the light which is reflected from said second mirror and to reflect said light to said third mirror, said third mirror being located to reflect the light which it receives from said second mirror in a path which clears said concave mirror, said first and second and third mirrors being shaped and located to produce a projection real image by said third mirror which is free from lateral inversion along said path.

2. An optical device according to claim 1, in which the respective lateral distances of the second and third mirrors from said axis respectively exceed the lateral distance of the edge of said concave mirror from said axis, said respective lateral distances being less than half the focal length of said concave mirror.

3. An optical device according to claim 1, in which the respective lateral distances of the second and third mirrors from said axis respectively exceed the lateral distance of the edge of said concave mirror from said axis, said first and second and said third mirrors being substantially planar, said respective lateral distances being less than half the focal length of said concave mirror.

4. An optical device which comprises a concave mirror which has a concave reflecting surface which has a geometrical vertex and an axis and a principal focus which is located on said axis in front of said vertex, a first mirror located forwardly of said concave mirror and rearwardly of said principal focus, said first mirror being thus located to intercept light which is forwardly reflected from said concave mirror, said first mirror being inclined to said axis and being of sufficiently small size to leave a part of said concave mirror unblocked to receive incident rays from an object located forwardly of said first mirror, a second mirror located forwardly of said concave mirror and rearwardly of said principal focus, a third mirror located forwardly of said concave mirror and rearwardly of said principal focus, said second mirror and said third mirror being located laterally on opposite sides of said axis, said second mirror being located and inclined to said axis to intercept the light which is reflected from said first mirror and to reflect said light to said third mirror, said third mirror being located to reflect the light which it receives from said second mirror in a path which clears said concave mirror, said first and second and third mirrors being shaped and located to produce a projected real image by said third mirror which is free from lateral inversion along said path, said path being substantially parallel to said axis, and said third mirror being located to produce said projected real image rearwardly of said concave mirror.

5. An optical device which comprises a concave mirror which has a concave reflecting surface which has a geometrical vertex and an axis and a principal focus which is located on said axis in front of said vertex, the focal length of said concave mirror being substantially 40 inches, a first planar mirror located forwardly of said concave mirror and rearwardly of said principal focus to intercept light which is forwardly reflected from said concave mirror, said axis intersecting substantially the central point of said first mirror, said first mirror being inclined to said axis at an angle of substantially 15° to 17°, the edge of the reflecting surface of said concave mirror having a diameter of substantially 6 inches, the top and bottom points of said first mirror being substantially 1.46 inches laterally from said axis, the axial distance between the center of said first mirror and the vertex of said concave mirror being substantially 13 inches to 14 inches, second and third substantially planar mirrors located at opposite sides of said axis with their centers at greater respective lateral distances from said axis than 3 inches, the points of said second and third mirrors which are laterally closest to said axis being at least substantially 3 inches laterally from said axis, said second and third mirrors being located rearwardly of said first mirror and forwardly of said concave mirror, said second and third mirrors being inclined to said axis and being located to successively reflect the light which is reflected from said first mirror, said second mirror being located and inclined to reflect light to said third mirror in a direction which is substantially perpendicular to said axis, said third mirror being located and inclined to reflect light rearwardly in a path which is substantially parallel to said axis and which clears said concave mirror, the distance of said second mirror from said first mirror and the distance of said third mirror from said second mirror being substantially 8 inches, the respective distances of the centers of said second and third mirrors from said axis, as measured in a direction perpendicular to said axis, being less than one half the focal length of said concave mirror.

6. An optical device which comprises a concave mirror which is shaped to produce a real original image of an object which is located forwardly of said concave mirror, said real original image thus produced being vertically inverted and laterally inverted, a first mirror located forwardly of said concave mirror to intercept light reflected forwardly from said concave mirror, said first mirror being located intermediate said concave mirror and the place of formation of said real original image, said first mirror being shaped to produce a first real reflected image of said object, a second mirror located to intercept the light which is reflected from said first mirror, said second mirror being located between said first mirror and the place of formation of said first real reflected image, said second mirror being shaped to produce a second real reflected image of said object, a third mirror located to intercept the light which is reflected from said second mirror, said third mirror being located intermediate said second mirror and the place of formation of said second reflected real image, said third mirror being shaped to produce a third reflected real image of said object, said first mirror being sufficiently small to leave a part of said concave mirror unblocked, said second and third mirrors being located to receive and reflect light in paths which are spaced from said concave mirror.

7. In combination, a concave mirror and a stop-plate, said concave mirror having a concave reflecting surface which has a vertex and a longitudinal optical axis which intersects said vertex and also having a principal focus which is located on said optical axis, said stop-plate being located forwardly of said vertex and rearwardly of said principal focus, said stop-plate being adjustably turnable relative to said concave mirror around a pivot axis which is substantially transversely perpendicular to said longitudinal axis, said pivot axis being located to substantially intersect said longitudinal axis and also to substantially intersect said stop-plate, said pivot-plate being turnably adjustable relative to said concave mirror to occupy a succession of different adjusted positions relative to said concave mirror to block different respective areas of said concave mirror, said vertex being located in said blocked areas, said stop-plate being shaped to provide blocked areas of substantially the same edge-shape.

8. In combination, a concave mirror and a disc-shaped stop-plate, said concave mirror having a reflecting surface which has a geometrical vertex and a longitudinal optical axis which intersects said vertex and also having a principal focus which is located on said optical axis, said stop-plate being adjustably turnable about a pivot axis which is transversely perpendicular to said optical axis, said pivot axis intersecting said optical axis and extending substantially through the central point of said stop plate, said pivot axis being located between said vertex and said principal focus.

9. An optical device which comprises a concave mirror which has a concave reflecting surface which has a geometrical vertex and a longitudinal optical axis which intersects said vertex, said concave mirror also having a principal focus which is located on said optical axis forwardly of said vertex, a first mirror located forwardly of said concave mirror and rearwardly of said principal focus, said first mirror having its reflecting surface facing said concave mirror, said first mirror being opaque and being located to block a part of the light from said concave mirror, a stop-plate located between and spaced from said concave mirror and said first mirror, said stop-plate being adjustably turnable relative to said first mirror and said concave mirror to block a selected area of said concave mirror additional to the blocked part thereof by said first mirror, said first mirror being inclined to said optical axes and being of sufficiently small size to leave a part of said concave mirror unblocked to receive incident rays from an object located forwardly of said first mirror, a second mirror located forwardly of said concave mirror and rearwardly of said first mirror, a third mirror located forwardly of said concave mirror and rearwardly of said first mirror, said second mirror and said third mirror being located laterally on opposite sides of said optical axis, said second mirror being located and inclined to said optical axis to intercept light which is reflected from said first mirror and to reflect said light to said third mirror, said third mirror being located to reflect the light which it receives from said second mirror in a path which clears said concave mirror, said stop-plate being movable to a position in which it clears the path of the reflected light from said first mirror to said second mirror and from said second mirror to said third mirror and from said third mirror, said first and second and third mirrors being shaped and located to produce a projected real image which is free from lateral inversion.

10. An optical device which comprises a concave mirror which has a concave reflecting surface which has a geometrical vertex and a longitudinal optical axis which intersects said vertex, said concave mirror also having a principal focus which is located on said optical axis forwardly of said vertex, a first and circular mirror located forwardly of said concave mirror and rearwardly of said principal focus, said optical axis intersecting the center of said first mirror, said first mirror having its reflecting surface facing said concave mirror, said first mirror being opaque and blocking an area of said concave mirror in which said vertex is located, a disc-shaped stop-plate located between and spaced from said concave mirror and said first mirror, said stop-plate being adjustably turnable relative to said concave mirror and said first mirror around a pivot axis which intersects and which is transversely perpendicular to said optical axis, said pivot axis extending through the central point of said stop-plate and being turnably adjustable to block an annular area of said concave mirror around the blocked part thereof, said first mirror being inclined to said optical axis and being of sufficient small size to leave a part of said concave mirror unblocked to receive incident rays from an object located forwardly of said first mirror, a second and third mirror located laterally on opposite sides of said optical axis and also located forwardly of said concave mirror and rearwardly of said first mirror, said second mirror being located and inclined to said optical axis to intercept light which is reflected from said first mirror and to reflect said light to said third mirror, said third mirror being located to reflect the light which it receives from said second mirror in a path which clears said concave mirror, the paths of light reflected from said first and second and third mirrors clearing said stop plate, said first and second and third mirrors being shaped and located to produce a projected real image which is free from lateral inversion.

FRANK G. BACK.

REFERENCES CITED

The following references are of record in the file of this patent:

UNITED STATES PATENTS

| Number | Name | Date |
| --- | --- | --- |
| 625,627 | Woody | May 23, 1899 |
| 1,551,291 | Evans | Aug. 25, 1925 |
| 1,591,211 | Brenkert et al. | July 6, 1926 |
| 2,152,202 | Miller | Mar. 28, 1939 |
| 2,309,788 | Ramberg | Feb. 2, 1943 |
| 2,409,186 | Bouwers | Oct. 15, 1946 |
| 2,504,384 | Bouwers | Apr. 18, 1950 |